(12) United States Patent
Tanaka

(10) Patent No.: US 11,008,447 B2
(45) Date of Patent: May 18, 2021

(54) TREAD RUBBER COMPOSITION AND PNEUMATIC TIRE

(71) Applicant: SUMITOMO RUBBER INDUSTRIES, LTD., Hyogo (JP)

(72) Inventor: Tatsuhiro Tanaka, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 73 days.

(21) Appl. No.: 16/417,457

(22) Filed: May 20, 2019

(65) Prior Publication Data

US 2019/0375919 A1    Dec. 12, 2019

(30) Foreign Application Priority Data

Jun. 6, 2018    (JP) .............................. JP2018-108665

(51) Int. Cl.
| | |
|---|---|
| *C08L 9/06* | (2006.01) |
| *C08K 3/36* | (2006.01) |
| *C08K 5/00* | (2006.01) |
| *C08L 91/06* | (2006.01) |
| *B60C 1/00* | (2006.01) |

(52) U.S. Cl.
CPC ..................................... *C08L 9/06* (2013.01); *C08K 3/36* (2013.01); *C08K 5/0091* (2013.01); *C08L 91/06* (2013.01); *B60C 1/0016* (2013.01); *C08K 2201/006* (2013.01)

(58) Field of Classification Search
None
See application file for complete search history.

(56) References Cited

U.S. PATENT DOCUMENTS

| | | | | |
|---|---|---|---|---|
| 2013/0303679 A1* | 11/2013 | Kunisawa | ............... | C08L 15/00 524/521 |
| 2014/0256847 A1* | 9/2014 | Sato | ....................... | C08K 5/548 523/156 |
| 2014/0275430 A1* | 9/2014 | Ishino | .................... | C08K 5/548 525/326.5 |
| 2014/0296376 A1* | 10/2014 | Sato | .......................... | C08L 7/00 523/156 |
| 2016/0009843 A1* | 1/2016 | Sato | ......................... | C08L 9/06 525/236 |
| 2017/0152370 A1* | 6/2017 | Mihara | .................. | C08K 5/548 |
| 2018/0094107 A1* | 4/2018 | Tanaka | .................. | B29D 30/06 |
| 2019/0375919 A1* | 12/2019 | Tanaka | .................... | C08K 3/36 |

FOREIGN PATENT DOCUMENTS

JP    2001-114939 A    4/2001

OTHER PUBLICATIONS

Payne Effect in Silica-Filled Styrene-Butadiene Rubber: Influence of Surface Treatment, Pamier et al., 2006, pp. 1-14 (Year: 2006).*

* cited by examiner

*Primary Examiner* — Peter A Salamon
(74) *Attorney, Agent, or Firm* — Studebaker & Brackett PC

(57) ABSTRACT

Provided are a tread rubber composition that provides a balanced improvement of fuel economy, fracture strength, and abrasion resistance, and a pneumatic tire including the rubber composition. The present invention relates to a tread rubber composition including: a rubber component; a silica having a nitrogen adsorption specific surface area of 220 m²/g or more; and a mercapto silane coupling agent, the tread rubber composition satisfying the following relationship (A):

$$(A) G^*(4\%) - G^*(64\%) \leq 150 [kPa]$$

wherein $G^*(4\%)$ is the shear modulus at an applied strain of 4% at 100° C., and $G^*(64\%)$ is the shear modulus at an applied strain of 64% at 100° C.

3 Claims, No Drawings

TREAD RUBBER COMPOSITION AND PNEUMATIC TIRE

TECHNICAL FIELD

The present invention relates to a tread rubber composition and a pneumatic tire.

BACKGROUND ART

In recent years, the cost increases associated with the rising fuel prices and the introduction of environmental regulations have led to a need for tires with excellent fuel economy in the transportation business. In order to improve fuel economy, Patent Literature 1, for example, proposes a method of improving fuel economy of a silica-containing rubber composition by adding a specific polar group to a rubber to provide affinity for silica. More recently, however, it has been desirable to further improve fuel economy.

Moreover, tires require not only fuel economy, but also require fracture strength and abrasion resistance, which are in a trade-off relationship with fuel economy. Thus, methods are needed to achieve a balanced improvement of fuel economy, fracture strength, and abrasion resistance.

CITATION LIST

Patent Literature

Patent Literature 1: JP 2001-114939 A

SUMMARY OF INVENTION

Technical Problem

The present invention aims to solve the problem and provide a tread rubber composition that provides a balanced improvement of fuel economy, fracture strength, and abrasion resistance, and a pneumatic tire including the rubber composition.

Solution to Problem

The present invention relates to a tread rubber composition, including: a rubber component; a silica having a nitrogen adsorption specific surface area of 220 m²/g or more; and a mercapto silane coupling agent, the tread rubber composition satisfying the following relationship (A):

$$(A) G^*(4\%) - G^*(64\%) \leq 150 [kPa]$$

wherein $G^*(4\%)$ is a shear modulus at an applied strain of 4% at 100° C., and $G^*(64\%)$ is a shear modulus at an applied strain of 64% at 100° C.

The rubber composition preferably contains a zinc dithiophosphate represented by the following formula (1):

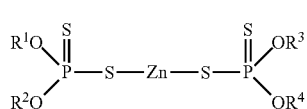

wherein $R^1$ to $R^4$ each independently represent a C1-C18 linear or branched alkyl group or a C5-C12 cycloalkyl group.

The mercapto silane coupling agent is preferably a silane coupling agent containing a linking unit A represented by the following formula (I) and a linking unit B represented by the following formula (II):

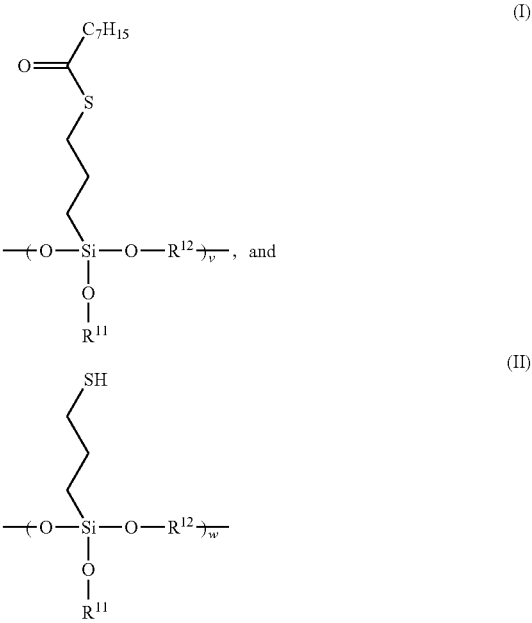

wherein v represents an integer of 0 or more; w represents an integer of 1 or more; $R^{11}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{12}$ represents a branched or unbranched C1-C30 alkylene group, a branched or unbranched C2-C30 alkenylene group, or a branched or unbranched C2-C30 alkynylene group, provided that $R^{11}$ and $R^{12}$ may together form a cyclic structure.

Another aspect of the present invention relates to a pneumatic tire, including a tread containing the rubber composition.

Advantageous Effects of the Invention

The tread rubber composition of the present invention contains a rubber component, a silica having a nitrogen adsorption specific surface area of 220 m²/g or more, and a mercapto silane coupling agent, and satisfies relationship (A). Such a tread rubber composition provides a balanced improvement of fuel economy, fracture strength, and abrasion resistance.

DESCRIPTION OF EMBODIMENTS

The tread rubber composition of the present invention contains a rubber component, a silica having a nitrogen adsorption specific surface area of 220 m²/g or more, and a mercapto silane coupling agent, and satisfies relationship (A).

The rubber composition provides the above-mentioned effects probably due to the following mechanism of action.

Silica having a nitrogen adsorption specific surface area of 220 m²/g or more (fine particle silica) shows low dispersibility, and this tendency is prominent in the presence of highly reactive mercapto silane coupling agents.

To overcome this problem, the rubber composition is adjusted to have a value of [G*(4%)–G*(64%)] (which serves as an indicator of dispersion of fillers in the rubber composition) within a range satisfying the relationship (A) below by promoting the reaction between the fine particle silica and the mercapto silane coupling agent, e.g. by varying the kneading method or adding processing aids. Thus, the large surface area of the fine particle silica and the high reactivity of the mercapto silane coupling agent permit formation of a dense network of the polymer (rubber component) and silica. For this reason, it is believed that abrasion resistance is significantly (synergistically) improved while simultaneously obtaining good fuel economy and fracture strength.

$$(A) G^*(4\%) - G^*(64\%) \leq 150 [kPa]$$

In relationship (A), G*(4%) is the shear modulus at an applied strain of 4% at 100° C., and G*(64%) is the shear modulus at an applied strain of 64% at 100° C.

In relationship (A), the strain dependency of G*, called the Payne effect, is considered to correlate with dispersion of silica in a rubber composition, and a smaller value of [G*(4%)–G*(64%)] indicates better dispersion of silica. The value of [G*(4%)–G*(64%)] in relationship (A) should be 150 kPa or less, preferably 140 kPa or less, more preferably 130 kPa or less, still more preferably 110 kPa or less. The lower limit is not particularly critical.

The range indicated in relationship (A) is determined for unvulcanized rubber compositions. When the value of [G*(4%)–G*(64%)] is determined for vulcanized rubber compositions, it is preferably within a range satisfying the relationship (B) below. The lower limit in relationship (B) is not particularly critical.

$$(B) G^*(4\%) - G^*(64\%) \leq 2.0 [MPa]$$

Examples of the rubber component used in the rubber composition include diene rubbers such as styrene butadiene rubber (SBR), polybutadiene rubber (BR), isoprene-based rubbers, acrylonitrile butadiene rubber (NBR), chloroprene rubber (CR), butyl rubber (IIR), and styrene-isoprene-butadiene copolymer rubber (SIBR). Each of these may be used alone, or two or more of these may be used in combination. SBR or BR is preferred among these.

Any SBR may be used. Examples include emulsion-polymerized styrene butadiene rubber (E-SBR) and solution-polymerized styrene butadiene rubber (S—SBR). Each of these may be used alone, or two or more of these may be used in combination.

The SBR preferably has a styrene content of 10% by mass or higher, more preferably 20% by mass or higher, but preferably 60% by mass or lower, more preferably 50% by mass or lower. Using SBR having a styrene content within the range indicated above, the effects tend to be better achieved.

The styrene content can be measured by the method described later in EXAMPLES.

The SBR preferably has a vinyl content of 10% by mass or higher, more preferably 15% by mass or higher, but preferably 70% by mass or lower, more preferably 60% by mass or lower. Using SBR having a vinyl content within the range indicated above, the effects tend to be better achieved.

The vinyl content (1,2-butadiene unit content) can be measured by the method described later in EXAMPLES.

The SBR preferably has a weight average molecular weight (Mw) of 400,000 or more, more preferably 500,000 or more, still more preferably 600,000 or more, but preferably 2,000,000 or less, more preferably 1,500,000 or less. Using SBR having a Mw within the range indicated above, the effects (particularly abrasion resistance) tend to be better achieved.

The Mw may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The SBR may be unmodified SBR or a modified SBR. The modified SBR may be any SBR having a functional group interactive with a filler such as silica. For example, it may be a chain end-modified SBR obtained by modifying at least one chain end of SBR with a compound (modifier) having the functional group (chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a multifunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Amino (preferably amino whose hydrogen atom is replaced with a C1-C6 alkyl group), alkoxy (preferably C1-C6 alkoxy), alkoxysilyl (preferably C1-C6 alkoxysilyl), and amide groups are preferred among these.

Examples of the modifier for the modified SBR include: polyglycidyl ethers of polyols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylamino diphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis (glycidyloxypropyl)-tetramethyldisiloxane and (3-glycidyloxypropyl)-pentamethyldisiloxane;

sulfide group-containing silane compounds such as (trimethylsilyl)[3-(trimethoxysilyl)propyl]sulfide, (trimethylsilyl)[3-(triethoxysilyl)propyl]sulfide, (trimethylsilyl)[3-(tripropoxysilyl)propyl]sulfide, (trimethylsilyl)[3-(tributoxysilyl)propyl]sulfide, (trimethylsilyl)[3-(methyldimethoxysilyl)propyl]sulfide, (trimethylsilyl)[3-(methyldiethoxysilyl)propyl]sulfide, (trimethylsilyl)[3-

(methyldipropoxysilyl)propyl]sulfide, and (trimethylsilyl)[3-(methyldibutoxysilyl)propyl]sulfide;

N-substituted aziridine compounds such as ethyleneimine and propyleneimine; alkoxysilanes such as methyltriethoxysilane, N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, N,N-bis(trimethylsilyl)aminoethyltriethoxysilane, and 3-diethylaminopropyltrimethoxysilane; (thio)benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N,N,N',N'-bis(tetraethylamino)benzophenone; benzaldehyde compounds containing amino and/or substituted amino groups such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam; and N,N-bis(2,3-epoxypropoxy)-aniline, 4,4-methylene-bis(N,N-glycidylaniline), tris(2,3-epoxypropyl)-1,3,5-triazine-2,4,6-triones, N,N-diethylacetamide, N-methylmaleimide, N,N-diethylurea, 1,3-dimethylethyleneurea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis(diphenylamino)-2-propanone, and 1,7-bis(methylethylamino)-4-heptanone. The modified SBR is preferably one modified with an alkoxysilane, among others.

The modification with the compound (modifier) can be performed by known methods.

Commercial products manufactured or sold by Sumitomo Chemical Co., Ltd., JSR Corporation, Asahi Kasei Corporation, Zeon Corporation, etc. may be used as the SBR.

The amount of the SBR, if present, based on 100% by mass of the rubber component is preferably 50% by mass or more, more preferably 70% by mass or more, still more preferably 80% by mass or more, but is preferably 95% by mass or less, more preferably 90% by mass or less. When the amount is within the range indicated above, the effects tend to be better achieved.

Any BR may be used, including high-cis BR, low-cis BR, and BR containing syndiotactic polybutadiene crystals. These may be used alone, or two or more of these may be used in combination.

The BR preferably has a cis content of 60% by mass or lower, more preferably 40% by mass or lower, but preferably 10% by mass or higher, more preferably 20% by mass or higher. Using BR having a cis content within the range indicated above, the effects tend to be better achieved.

The cis content can be measured by infrared absorption spectrometry.

The BR may be unmodified BR or a modified BR. The modified BR may be a modified BR into which any of the above-mentioned functional groups is introduced. The modifier used for the modified BR is preferably a diglycidylamino compound such as tetraglycidyl-1,3-bisaminomethylcyclohexane, more preferably tetraglycidyl-1,3-bisaminomethylcyclohexane.

Commercial products of Ube Industries, Ltd., JSR Corporation, Asahi Kasei Corporation, Zeon Corporation, etc. may be used as the BR.

The amount of the BR, if present, based on 100% by mass of the rubber component is preferably 5% by mass or more, more preferably 10% by mass or more, but is preferably 50% by mass or less, more preferably 30% by mass or less, still more preferably 20% by mass or less. When the amount is within the range indicated above, the effects tend to be better achieved.

The rubber composition contains a silica having a nitrogen adsorption specific surface area of 220 $m^2/g$ or more (fine particle silica). Fine particle silica is difficult to disperse in rubber, but if dispersed, it can dramatically increase the reactive sites with silane coupling agents as compared to usual silica owing to its high surface area. In the rubber composition adjusted within a range satisfying relationship (A), the fine particle silica is well dispersed. Thus, it can significantly improve properties such as abrasion resistance as compared to usual silica.

Examples of the fine particle silica include dry silica (anhydrous silica) and wet silica (hydrous silica). Wet silica is preferred as it has a large number of silanol groups. Each of these may be used alone, or two or more of these may be used in combination.

The fine particle silica should have a nitrogen adsorption specific surface area ($N_2SA$) of 220 $m^2/g$ or more, preferably 230 $m^2/g$ or more, more preferably 240 $m^2/g$ or more, but preferably 300 $m^2/g$ or less, more preferably 260 $m^2/g$ or less. When the $N_2SA$ is within the range indicated above, the effects tend to be better achieved.

The nitrogen adsorption specific surface area of the fine particle silica is determined by the BET method in accordance with ASTM D3037-81.

Commercial products of Evonik Degussa, Rhodia, etc. may be used as the fine particle silica.

The amount of the fine particle silica per 100 parts by mass of the rubber component is preferably 30 parts by mass or more, more preferably 50 parts by mass or more, still more preferably 60 parts by mass or more, but is preferably 100 parts by mass or less, more preferably 80 parts by mass or less. When the amount is within the range indicated above, the effects tend to be better achieved.

The rubber composition may contain an additional silica (a silica having a $N_2SA$ of less than 220 $m^2/g$) in combination with the fine particle silica.

The amount of the additional silica, if present, per 100 parts by mass of the rubber component is preferably 1 part by mass or more, more preferably 5 parts by mass or more, but is preferably 50 parts by mass or less, more preferably 30 parts by mass or less. When the amount is within the range indicated above, the effects tend to be better achieved.

The rubber composition contains a mercapto silane coupling agent. Mercapto silane coupling agents are highly reactive and thus can form a bulky gel layer on the surface of silica. Thus, they can improve properties such as abrasion resistance as compared to other silane coupling agents.

The term "mercapto silane coupling agent" used in the rubber composition refers to a silane coupling agent having a mercapto group, and excludes those whose mercapto groups are protected by protecting groups, such as 3-octanoylthiopropyltriethoxysilane.

Examples of the mercapto silane coupling agent include 3-mercaptopropyltrimethoxysilane, 3-mercaptopropyltriethoxysilane, 2-mercaptoethyltrimethoxysilane, 2-mercaptoethyltriethoxysilane, and the compound represented by the following formula (Si363 available from Evonik Degussa). Each of these may be used alone, or two or more of these may be used in combination.

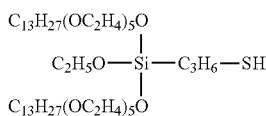

The mercapto silane coupling agent may particularly suitably be a silane coupling agent containing a linking unit A represented by the formula (I) below and a linking unit B represented by the formula (II) below. Such silane coupling agents themselves are in oligomeric form and thus can form a more bulky gel layer on the surface of silica and significantly improve properties such as abrasion resistance as compared to the above-mentioned monomolecular mercapto silane coupling agents.

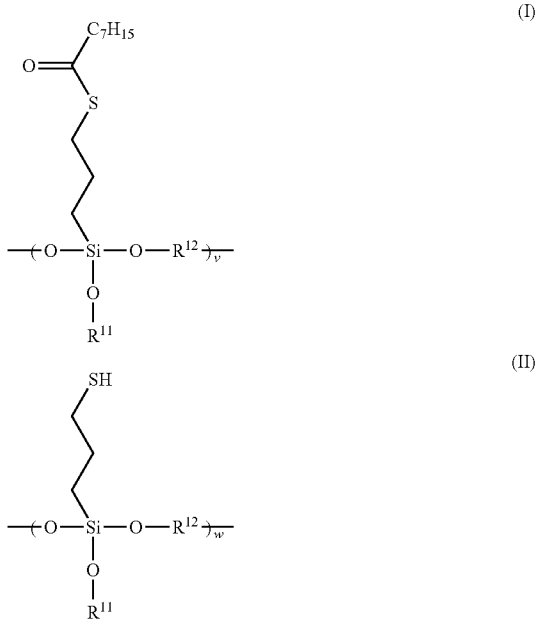

In the formulas, v represents an integer of 0 or more; w represents an integer of 1 or more; $R^{11}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{12}$ represents a branched or unbranched C1-C30 alkylene group, a branched or unbranched C2-C30 alkenylene group, or a branched or unbranched C2-C30 alkynylene group, provided that $R^{11}$ and $R^{12}$ may together form a cyclic structure.

In the silane coupling agent containing a linking unit A of formula (I) and a linking unit B of formula (II), the amount of the linking unit A is preferably 30 mol % or more, more preferably 50 mol % or more, but is preferably 99 mol % or less, more preferably 90 mol % or less. The amount of the linking unit B is preferably 1 mol % or more, more preferably 5 mol % or more, still more preferably 10 mol % or more, but is preferably 70 mol % or less, more preferably 65 mol % or less, still more preferably 55 mol % or less. The combined amount of the linking units A and B is preferably 95 mol % or more, more preferably 98 mol % or more, particularly preferably 100 mol %.

The amount of the linking unit A or B refers to the amount including the linking unit A or B present at the end of the silane coupling agent, if any. In the case where the linking unit A or B is present at the end of the silane coupling agent, its form is not particularly limited as long as it forms a unit corresponding to formula (I) representing the linking unit A or formula (II) representing the linking unit B.

With regard to $R^{11}$ in formulas (I) and (II), examples of the halogen atom include chlorine, bromine, and fluorine atoms; examples of the branched or unbranched C1-C30 alkyl group include methyl and ethyl groups; examples of the branched or unbranched C2-C30 alkenyl group include vinyl and 1-propenyl groups; and examples of the branched or unbranched C2-C30 alkynyl group include ethynyl and propynyl groups.

With regard to $R^{12}$ in formulas (I) and (II), examples of the branched or unbranched C1-C30 alkylene group include ethylene and propylene groups; examples of the branched or unbranched C2-C30 alkenylene group include vinylene and 1-propenylene groups; and examples of the branched or unbranched C2-C30 alkynylene group include ethynylene and propynylene groups.

In the silane coupling agent containing a linking unit A of formula (I) and a linking unit B of formula (II), the total number of repetitions (v+w) consisting of the sum of the number of repetitions (v) of the linking unit A and the number of repetitions (w) of the linking unit B is preferably in the range of 3 to 300.

The amount of the mercapto silane coupling agent per 100 parts by mass of silica is preferably 3 parts by mass or more, more preferably 6 parts by mass or more, but is preferably 15 parts by mass or less, more preferably 10 parts by mass or less. When the amount is within the range indicated above, the effects tend to be better achieved.

The rubber composition preferably contains a zinc dithiophosphate represented by the formula (1) below as a processing aid. This suppresses gelation caused by the reaction between the polymer (rubber component) and the mercapto silane coupling agent, thereby promoting dispersion of the fine particle silica.

Further, since the zinc dithiophosphate has a higher cure acceleration effect than zinc oxide, its use in the rubber composition permits reduction in the amount of sulfur, thereby further improving properties such as abrasion resistance.

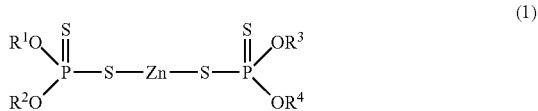

In the formula, $R^1$ to $R^4$ each independently represent a C1-C18 linear or branched alkyl group or a C5-C12 cycloalkyl group.

With regard to $R^1$ to $R^4$ in formula (1), examples of the linear or branched alkyl group include methyl, ethyl, n-propyl, iso-propyl, n-butyl, 4-methylpentyl, 2-ethylhexyl, octyl, and octadecyl groups; and examples of the cycloalkyl group include cyclopentyl, cyclohexyl, and cyclooctyl groups. For better dispersion in the rubber composition and easy production, $R^1$ to $R^4$ are each preferably a C2-C8 linear or branched alkyl group, more preferably a n-butyl, n-propyl, iso-propyl, or n-octyl group, still more preferably a n-butyl group.

Such zinc dithiophosphates may be used alone or in combinations of two or more. Commercial products of Rhein Chemie, etc. may be used as the zinc dithiophosphate.

The amount (amount of active ingredient) of the zinc dithiophosphate, if present, per 100 parts by mass of the rubber component is preferably 0.1 parts by mass or more, more preferably 0.2 parts by mass or more, but is preferably 5 parts by mass or less, more preferably 2 parts by mass or less, still more preferably 1 part by mass or less. When the amount is within the range indicated above, the effects tend to be better achieved.

The rubber composition preferably contains a fatty acid amide as a processing aid. This promotes dispersion of the fine particle silica.

The fatty acid amide may be either a saturated fatty acid amide or an unsaturated fatty acid amide. Examples of the saturated fatty acid amide include N-(1-oxooctadecyl) sarcosine, stearamide, and behenamide. Examples of the unsaturated fatty acid amide include oleamide and erucamide. The fatty acid of the fatty acid amide preferably has a carbon number of 6 or more, more preferably 10 or more, still more preferably 14 or more, but preferably 28 or less, more preferably 25 or less, still more preferably 20 or less. Such fatty acid amides may be used alone or in combinations of two or more.

The amount of the fatty acid amide, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects tend to be better achieved.

A mixture of a fatty acid amide and a metal salt of a fatty acid may also be suitably used in the rubber composition.

Examples of the fatty acid of the metal salt of a fatty acid include, but are not limited to, saturated or unsaturated fatty acids, preferably C6-C28, more preferably C10-C25, still more preferably C14-C20 saturated or unsaturated fatty acids, such as lauric acid, myristic acid, palmitic acid, stearic acid, oleic acid, linoleic acid, linolenic acid, arachidic acid, behenic acid, and nervonic acid. These may be used alone or as a mixture of two or more. Among these, saturated fatty acids are preferred, with C14-C20 saturated fatty acids being more preferred.

Examples of the metal of the metal salt of a fatty acid include alkali metals such as potassium and sodium, alkaline-earth metals such as magnesium, calcium, and barium, zinc, nickel, and molybdenum.

The amount of the mixture, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects tend to be better achieved.

Commercial products of Performance Additives, NOF Corporation, etc. may be used as the fatty acid amide or the mixture.

The rubber composition preferably contains carbon black. In this case, the effects tend to be better achieved.

Non-limiting examples of the carbon black include N134, N110, N220, N234, N219, N339, N330, N326, N351, N550, and N762. These may be used alone, or two or more of these may be used in combination.

The carbon black preferably has a nitrogen adsorption specific surface area ($N_2SA$) of 80 $m^2/g$ or more, more preferably 110 $m^2/g$ or more, but preferably 200 $m^2/g$ or less, more preferably 150 $m^2/g$ or less. When the $N_2SA$ is within the range indicated above, the effects tend to be better achieved.

The $N_2SA$ of the carbon black is measured in accordance with JIS K6217-2:2001.

Commercial products of Asahi Carbon Co., Ltd., Cabot Japan K. K., Tokai Carbon Co., Ltd., Mitsubishi Chemical Corporation, Lion Corporation, NSCC Carbon Co., Ltd., Columbia Carbon, etc. may be used as the carbon black.

The amount of the carbon black, if present, per 100 parts by mass of the rubber component is preferably 1 part by mass or more, more preferably 5 parts by mass or more, but is preferably 30 parts by mass or less, more preferably 10 parts by mass or less. When the amount is within the range indicated above, the effects can be more suitably achieved.

The rubber composition may contain an oil. The oil may be, for example, a process oil, a vegetable fat or oil, or a mixture thereof. Examples of the process oil include paraffinic process oils, aromatic process oils, and naphthenic process oils. Examples of the vegetable fat or oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone, or two or more of these may be used in combination. In order to well achieve the effects, process oils are preferred among these, with aromatic process oils being more preferred.

The amount of the oil, if present, per 100 parts by mass of the rubber component is preferably 5 parts by mass or more, more preferably 10 parts by mass or more, but is preferably 30 parts by mass or less, more preferably 20 parts by mass or less. When the amount is within the range indicated above, the effects tend to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination. Petroleum waxes are preferred among these, with paraffin waxes being more preferred.

Commercial products of Ouchi Shinko Chemical Industrial Co., Ltd., Nippon Seiro Co., Ltd., Seiko Chemical Co., Ltd., etc. may be used as the wax.

The amount of the wax, if present, per 100 parts by mass of the rubber component is preferably 1 part by mass or more, more preferably 1.5 parts by mass or more, but is preferably 20 parts by mass or less, more preferably 10 parts by mass or less. When the amount is within the range indicated above, the effects tend to be better achieved.

The rubber composition may contain an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl) propionate]methane. These may be used alone, or two or more of these may be used in combination. Among these, p-phenylenediamine or qunoline antioxidants are preferred.

Commercial products of Seiko Chemical Co., Ltd., Sumitomo Chemical Co., Ltd., Ouchi Shinko Chemical Industrial Co., Ltd., Flexsys, etc. may be used as the antioxidant.

The amount of the antioxidant, if present, per 100 parts by mass of the rubber component is preferably 1 part by mass or more, more preferably 3 parts by mass or more, but is preferably 10 parts by mass or less, more preferably 8 parts by mass or less. When the amount is within the range indicated above, the effects tend to be better achieved.

The rubber composition may contain stearic acid.

The stearic acid may be a conventional one, and examples include products of NOF Corporation, Kao Corporation, Fujifilm Wako Pure Chemical Corporation, and Chiba Fatty Acid Co., Ltd.

The amount of the stearic acid, if present, per 100 parts by mass of the rubber component is preferably 1 part by mass or more, more preferably 2 parts by mass or more, but is preferably 10 parts by mass or less, more preferably 5 parts by mass or less. When the amount is within the range indicated above, the effects tend to be better achieved.

The rubber composition may contain zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide, if present, per 100 parts by mass of the rubber component is preferably 1 part by mass or more, more preferably 2 parts by mass or more, but is preferably 10 parts by mass or less, more preferably 5 parts by mass or less. When the amount is within the range indicated above, the effects tend to be better achieved.

The rubber composition may contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

Commercial products of Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. may be used as the sulfur.

The amount of the sulfur, if present, per 100 parts by mass of the rubber component is preferably 0.5 parts by mass or more, more preferably 1 part by mass or more, but is preferably 3 parts by mass or less, more preferably 2 parts by mass or less, still more preferably 1.5 parts by mass or less. When the amount is within the range indicated above, the effects tend to be better achieved.

The rubber composition may incorporate a hybrid crosslinking agent as a crosslinking agent other than sulfur. This further improves properties such as abrasion resistance.

Examples of the hybrid crosslinking agent include alkyl sulfide crosslinking agents and alkylphenol-sulfur chloride condensates. Each of these may be used alone, or two or more of these may be used in combination. Among these, alkyl sulfide crosslinking agents are preferred, with 1,6-bis(N,N'-dibenzylthiocarbamoyldithio) hexane being more preferred.

Commercial products of Kawaguchi Chemical Industry Co., Ltd., Lanxess, etc. may be used as the hybrid crosslinking agent.

The amount of the hybrid crosslinking agent, if present, per 100 parts by mass of the rubber component is preferably 1 part by mass or more, more preferably 2 parts by mass or more, but is preferably 8 parts by mass or less, more preferably 5 parts by mass or less. When the amount is within the range indicated above, the effects tend to be better achieved.

The rubber composition may contain a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazolylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. Among these, thiazole or thiuram vulcanization accelerators are preferred in order to more suitably achieve the effects.

The amount of the vulcanization accelerator, if present, per 100 parts by mass of the rubber component is preferably 1 part by mass or more, more preferably 2 parts by mass or more, but is preferably 10 parts by mass or less, more preferably 5 parts by mass or less. When the amount is within the range indicated above, the effects tend to be better achieved.

In addition to the above-mentioned ingredients, the rubber composition may contain additives commonly used in the tire industry. Examples of such additives include organic peroxides, and fillers such as calcium carbonate, talc, alumina, clay, aluminum hydroxide, and mica. The amount of the additives per 100 parts by mass of the rubber component is preferably 0.1 to 200 parts by mass.

The rubber composition may be prepared, for example, by kneading the ingredients in a rubber kneading machine, and vulcanizing the kneaded mixture. Examples of the rubber kneading machine include intermeshing intermix type mixers (I/M mixers), tangential Banbury type mixers (B/B mixers), and pressure kneaders. I/M mixers are preferred. I/M mixers have high efficiency in cooling the kneaded mixture during kneading and thus can perform kneading with a higher shear force while reducing a temperature rise. For this reason, I/M mixers can be used to promote dispersion of the fine particle silica.

The following kneading conditions may be used. In a base kneading step which includes kneading additives other than vulcanizing agents and vulcanization accelerators, the kneading temperature is usually 100 to 180° C., but in order to improve dispersion of the fine particle silica, kneading is preferably performed for about 1 to 5 minutes while maintaining the temperature at 130 to 165° C. In a final kneading step which includes kneading vulcanizing agents and vulcanization accelerators, the kneading temperature is usually 120° C. or lower, and preferably 85 to 110° C. The composition obtained by kneading vulcanizing agents and vulcanization accelerators is usually vulcanized, e.g. by press vulcanization. The vulcanization temperature is usually 140 to 190° C., preferably 150 to 185° C. The vulcanization time is usually 5 to 15 minutes.

The rubber composition is for use in treads (cap treads).

The pneumatic tire of the present invention may be prepared using the rubber composition by usual methods.

Specifically, the rubber composition before vulcanization may be extruded into the shape of a tread and then assembled with other tire components on a tire building machine in a usual manner to build an unvulcanized tire, which may then be heated and pressurized in a vulcanizer to produce a tire.

The pneumatic tire may be used, for example, as a tire for passenger cars, trucks and buses, or two-wheeled vehicles, or as a high performance tire, and is particularly suitable as a tire for passenger cars.

EXAMPLES

The present invention will be specifically described with reference to, but not limited to, examples.

The chemicals used in the examples are listed below.

SBR 1: modified SBR synthesized in Production Example 1 below (styrene content: 35% by mass, vinyl content: 40% by mass, Mw: 800,000)

SBR 2: modified SBR synthesized in Production Example 2 below (styrene content: 25% by mass, vinyl content: 57% by mass, Mw: 400,000)

BR: N103 available from Asahi-Kasei Chemicals Corporation (BR terminally modified by a mixture of tetraglycidyl-1,3-bisaminomethylcyclohexane and its oligomer component, cis content: 38% by mass)

Carbon black: N220 available from Mitsubishi Chemical Corporation ($N_2SA$: 111 $m^2/g$)

Silica 1: ULTRASIL VN3 available from Evonik Degussa ($N_2SA$: 175 $m^2/g$)

Silica 2: ULTRASIL 9000GR available from Evonik Degussa ($N_2SA$: 240 $m^2/g$)

Silane coupling agent 1: Si266 (bis(3-triethoxysilyl-propyl)disulfide) available from Evonik Degussa Silane coupling agent 2: NXT-Z45 available from Momentive (copolymer of linking units A and B, linking unit A: 55 mol %, linking unit B: 45 mol %)

Oil 1: VIVATEC500 (TDAE oil) available from H&R

Oil 2: mineral oil available from JXTG Nippon Oil & Energy Corporation

Wax: Ozoace 0355 available from Nippon Seiro Co., Ltd.

Antioxidant 6C: NOCRAC 6C (N-phenyl-N'-(1,3-dimethylbutyl)-p-phenylenediamine) available from Ouchi Shinko Chemical Industrial Co., Ltd.

Antioxidant FR: Antigene FR available from Sumitomo Chemical Co., Ltd. (purified reaction product of amine and ketone with no residual amine, a quinoline antioxidant)

Fatty acid amide: ULTRA-LUBE 160 available from Performance Additives (structure of fatty acid soaps and amides)

Stearic acid: stearic acid "TSUBAKI" available from NOF Corporation

Zinc oxide: zinc oxide #1 available from Mitsui Mining & Smelting Co., Ltd.

Zinc dithiophosphate: TP-50 available from Rhein Chemie (mixture of zinc dithiophosphate and polymer, formula (1) wherein $R^1$ to $R^4$ are n-butyl groups, active ingredient 50% by mass)

Sulfur: HK-200-5 (5% by mass oil-containing powdered sulfur) available from Hosoi Chemical Industry Co., Ltd.

Vulcanization accelerator CZ: NOCCELER CZ (N-cyclohexyl-2-benzothiazolylsulfenamide) available from Ouchi Shinko Chemical Industrial Co., Ltd.

Vulcanization accelerator TBzTD: NOCCELER TBzTD (tetrabenzylthiuram disulfide) available from Ouchi Shinko Chemical Industrial Co., Ltd.

Production Example 1

A nitrogen-purged autoclave reactor was charged with cyclohexane, tetrahydrofuran, styrene, and 1,3-butadiene. The temperature of the contents of the reactor was adjusted to 20° C., and then n-butyllithium was added to initiate polymerization. The polymerization was carried out under adiabatic conditions, and the maximum temperature reached 85° C. Once the polymerization conversion ratio reached 99%, 1,3-butadiene was added, followed by polymerization for five minutes. Then, N,N-bis(trimethylsilyl)-3-aminopropyl-trimethoxysilane was added as a modifier, and a reaction was performed. After completion of the polymerization, 2,6-di-tert-butyl-p-cresol was added, and then the solvent was removed by steam stripping. The resulting product was dried on hot rolls adjusted at 110° C. to obtain SBR 1.

Production Example 2

A nitrogen-purged autoclave reactor was charged with cyclohexane, tetrahydrofuran, styrene, and 1,3-butadiene. The temperature of the contents of the reactor was adjusted to 20° C., and then n-butyllithium was added to initiate polymerization. The polymerization was carried out under adiabatic conditions, and the maximum temperature reached 85° C. Once the polymerization conversion ratio reached 99%, 1,3-butadiene was added, followed by polymerization for five minutes. Then, 3-diethylaminopropyltrimethoxysilane was added as a modifier, and a reaction was performed. After completion of the polymerization, 2,6-di-tert-butyl-p-cresol was added, and then the solvent was removed by steam stripping. The resulting product was dried on hot rolls adjusted at 110° C. to obtain SBR 2.

(Analysis of SBR>

The structure (styrene content, vinyl content) of the SBRs was identified with a device of JNM-ECA series available from JEOL Ltd. An amount of 0.1 g of each polymer was dissolved in 15 mL of toluene, and the solution was slowly poured into 30 mL of methanol for reprecipitation. The precipitate was dried under reduced pressure and then subjected to analysis.

Examples and Comparative Examples

According to the recipes shown in Table 1, the chemicals other than the sulfur and vulcanization accelerators were kneaded in an intermeshing mixer (I/M mixer, available from HF) for 4 minutes while maintaining the temperature at 130 to 165° C. to obtain a kneaded mixture.

Next, the sulfur and vulcanization accelerators were added to the kneaded mixture, and they were kneaded in an open roll mill at 80° C. for 5 minutes to obtain an unvulcanized rubber composition.

The unvulcanized rubber composition was formed into a tread shape and assembled with other tire components to build an unvulcanized tire, which was then press-vulcanized at 150° C. for 12 minutes to prepare a test tire (size: 195/65R15).

The unvulcanized rubber compositions and test tires prepared as above were evaluated as described below. Table 1 shows the results.

Comparative Example 1 set equal to 100. A higher index means that the distance caused a 1 mm decrease in tire groove depth is longer, and thus abrasion resistance is better.

TABLE 1

|  |  | Comparative Example | | | | | Example | | | |
|---|---|---|---|---|---|---|---|---|---|---|
|  |  | 1 | 2 | 3 | 4 | 5 | 1 | 2 | 3 | 4 |
| Formulation (parts by mass) | SBR1 | 45 | 45 | 45 | 45 | 45 | 45 | 45 | 45 | 45 |
|  | SBR2 | 35 | 35 | 35 | 35 | 35 | 35 | 35 | 35 | 35 |
|  | BR | 20 | 20 | 20 | 20 | 20 | 20 | 20 | 20 | 20 |
|  | Carbon black | 5 | 5 | 5 | 5 | 5 | 5 | 5 | 5 | 5 |
|  | Silica 1 | 60 | — | 60 | 60 | — | — | — | — | — |
|  | Silica 2 | — | 60 | — | — | 60 | 60 | 60 | 60 | 60 |
|  | Silane coupling agent 1 | 4.8 | 4.8 | — | — | — | — | — | — | — |
|  | Silane coupling agent 2 | — | — | 4.8 | 6 | 6 | 6 | 4.8 | 6 | 4.8 |
|  | Oil 1 | 8 | 8 | 8 | 8 | 8 | 8 | 8 | 8 | 8 |
|  | Oil 2 | 3 | 3 | 3 | 3 | 3 | 3 | 3 | 3 | 3 |
|  | Wax | 1.5 | 1.5 | 1.5 | 1.5 | 1.5 | 1.5 | 1.5 | 1.5 | 1.5 |
|  | Antioxidant 6C | 2 | 2 | 2 | 2 | 2 | 2 | 2 | 2 | 2 |
|  | Antioxidant FR | 1 | 1 | 1 | 1 | 1 | 1 | 1 | 1 | 1 |
|  | Fatty acid amide | 1 | 1 | 1 | 1 | 1 | 1 | 1 | 1 | 1 |
|  | Stearic acid | 2 | 2 | 2 | 2 | 2 | 2 | 2 | 2 | 2 |
|  | Zinc oxide | 2 | 2 | 2 | 2 | 2 | 2 | 2 | 2 | 2 |
|  | Zinc dithiophosphate | 0.5 | 0.5 | 0.5 | 0.5 | — | 0.5 | 0.5 | 1 | 1 |
|  | Sulfur | 1.5 | 1.5 | 1.5 | 1.5 | 1.5 | 1.5 | 1.5 | 1.5 | 1.5 |
|  | Vulcanization accelerator CZ | 2 | 2 | 2 | 2 | 2 | 2 | 2 | 1.7 | 1.7 |
|  | Vulcanization accelerator TBzTD | 0.3 | 0.3 | 0.3 | 0.3 | 0.3 | 0.3 | 0.3 | 0.3 | 0.3 |
| Evaluation | ⊿G* (unvulcanized rubber) [KPa] | 240 | 280 | 180 | 140 | 160 | 150 | 150 | 140 | 130 |
|  | ⊿G* (Vulcanized rubber) [MPa] | 2.8 | 3.1 | 2.2 | 1.8 | 2.1 | 2.0 | 1.9 | 1.7 | 1.6 |
|  | Fuel economy index | 100 | 93 | 108 | 111 | 110 | 112 | 107 | 117 | 112 |
|  | Fracture strength index | 100 | 110 | 96 | 87 | 92 | 108 | 115 | 102 | 107 |
|  | Abrasion resistance index | 100 | 106 | 105 | 103 | 128 | 135 | 128 | 132 | 129 |

(ΔG*)

The shear modulus G* of the unvulcanized rubber compositions was measured with RPA2000 available from Alpha Technologies. The measurement temperature was 100° C. G* was measured over a strain range of 4% to 64% to determine ΔG*=G*(4%)−G*(64%). A lower ΔG* indicates better dispersion of the silica in the rubber composition.

The vulcanized rubber compositions cut out of the test tires were also measured under the same conditions to determine ΔG*.

(Fuel Economy)

The rolling resistance of each test tire was measured using a rolling resistance tester by running the test tire mounted on a 15×6JJ rim at an internal pressure of 230 kPa, a load of 3.43 kN, and a speed of 80 km/h. The rolling resistances are expressed as an index (fuel economy index), with Comparative Example 1 set equal to 100. A higher index indicates better fuel economy.

(Fracture Strength)

No. 3 dumbbell specimens prepared from the vulcanized rubber compositions cut out of the treads of the test tires were subjected to tensile testing in accordance with JIS K 6251 to measure tensile strength at break (TB) and elongation at break (EB) (%). Then, a value of (TB×EB/2) was calculated and used as a fracture strength. The fracture strengths are expressed as an index, with Comparative Example 1 set equal to 100. A higher index indicates better fracture strength.

(Abrasion Resistance)

Each set of test tires were mounted on the wheels of a front-engine, front-wheel-drive car of 2000 cc displacement made in Japan. After running 8000 km, the groove depth in the tire tread portion was measured. A distance that caused a 1 mm decrease in tire groove depth was calculated and expressed as an index (abrasion resistance index), with As shown in Table 1, the examples containing a silica having a nitrogen adsorption specific surface area of 220 m²/g or more and a mercapto silane coupling agent and satisfying relationship (A) achieved a balanced improvement of fuel economy, fracture strength, and abrasion resistance.

The invention claimed is:

1. A pneumatic tire, comprising a tread comprising a tread rubber composition, the tread rubber composition comprising:
   a rubber component;
   a silica having a nitrogen adsorption specific surface area of 220 m²/g or more; and
   a mercapto silane coupling agent,
   the tread rubber composition satisfying the following relationship (A):

$$(A) G*(4\%) - G*(64\%) \leq 150 [kPa]$$

wherein G*(4%) is a shear modulus at an applied strain of 4% at 100° C., and G*(64%) is a shear modulus at an applied strain of 64% at 100° C.

2. The pneumatic tire according to claim 1,
   wherein the tread rubber composition comprises a zinc dithiophosphate represented by the following formula (1):

(1)

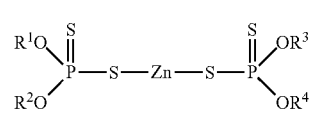

wherein R¹ to R⁴ each independently represent a C1-C18 linear or branched alkyl group or a C5-C12 cycloalkyl group.

3. The pneumatic tire according to claim 1,
wherein the mercapto silane coupling agent is a silane coupling agent containing a linking unit A represented by the following formula (I) and a linking unit B represented by the following formula (II):

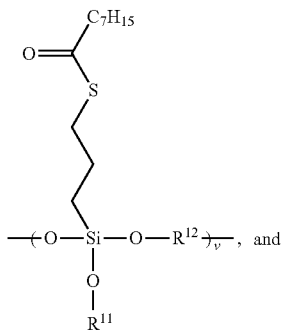

(I)

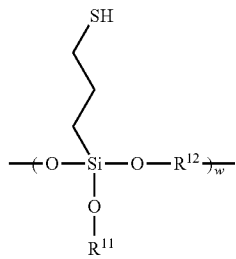

(II)

wherein v represents an integer of 0 or more; w represents an integer of 1 or more; $R^{11}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{12}$ represents a branched or unbranched C1-C30 alkylene group, a branched or unbranched C2-C30 alkenylene group, or a branched or unbranched C2-C30 alkynylene group, provided that $R^{11}$ and $R^{12}$ may together form a cyclic structure.

* * * * *